United States Patent [19]
Hoag

[11] Patent Number: 5,859,976
[45] Date of Patent: Jan. 12, 1999

[54] SYSTEM AND METHOD FOR ENABLING A DATA/VIDEO SERVER TO IMPLEMENT OPERATION IN ACCORDANCE WITH A NEW CONNECTION DIAGRAM, AND A DATA/VIDEO SERVER INCLUDING THAT SYSTEM

[75] Inventor: Joseph E. Hoag, Murray, Utah

[73] Assignee: Philips Electronics North America Corporation, New York, N.Y.

[21] Appl. No.: 681,647

[22] Filed: Jul. 29, 1996

[51] Int. Cl.$^6$ .................................................... H04N 7/10
[52] U.S. Cl. ................................................ 395/200.47; 348/7
[58] Field of Search .................. 395/200.47, 200.61, 395/200.3–200.39, 200.4–200.54, 677; 386/69; 348/6, 7, 10, 12; 455/6.3; 370/229, 230, 255, 468; 375/240; H04N 7/10

[56] References Cited

U.S. PATENT DOCUMENTS

| | | | |
|---|---|---|---|
| 5,539,660 | 7/1996 | Blair et al. . | |
| 5,606,359 | 2/1997 | Youden et al. | 348/7 |
| 5,608,448 | 3/1997 | Smoral et al. | 348/7 |
| 5,694,334 | 12/1997 | Donahue et al. | 364/516 R |

OTHER PUBLICATIONS

U.S. application No. 08/389,672, filed Feb. 16, 1995.

*Primary Examiner*—Andrew I. Faile
*Assistant Examiner*—Ronald D. House
*Attorney, Agent, or Firm*—Gregory L. Thorne

[57] ABSTRACT

A data/video server having the following elements: n I/O access channel connectors, m storage arrays and a commutator which connects individual ones of the I/O access channel connectors to different individual ones of the storage arrays in accordance with a connection diagram with which the server is being operated in accordance with at a given time, further includes a system (operating in accordance with a method) for enabling it to implement operation in accordance with a new connection diagram (which can enable the bandwidth provided to one or more I/O access channels coupled thereto to be changed). That system includes a bandwidth manager for generating a new connection diagram; and a control system, coupled to the bandwidth manager, for obtaining the new connection diagram and causing the elements of the server to implement operation in accordance with the new connection diagram. The bandwidth manager is included in one of the storage arrays, and the control system is made of microprocessors which are individually included in each of the different elements of the server. First counters are included in each of the elements to aid in synchronizing those elements so that they can implement operation in accordance the new connection diagram at substantially the same time. Second counters are included in the elements to aid the microprocessors ensuring that as the elements implement operation in accordance with the new connection diagram, by begin operating in accordance therewith, the beginning of such operating is subject to and in accordance with one or more transition rules. The server also includes a counter signal generator for incrementing the first and second counters when appropriate.

31 Claims, 3 Drawing Sheets

FIG. 3

| SA₁ | ACC₁ | ACC₁ | ACC₁ | ACC₁ | ACC₂ | ACC₂ | ACC₂ | ACC₃ | ACC₃ | ACC₃ |
| SA₂ | ACC₃ | ACC₁ | | | | | | | | |
| t1 | t2 | t3 | t4 | t5 | t6 | t7 | t8 | t9 | t10 | t11 |

| SA₁ | | ACC₁ | ACC₃ | ACC₁ | ACC₃ | | ACC₁ | ACC₁ | ACC₂ | ACC₂ | ACC₂ |
| SA₂ | ACC₃ | | ACC₁ | ACC₃ | ACC₁ | ACC₃ | | | | | |
| t1 | t2 | t3 | t4 | t5 | t6 | t7 | t8 | t9 | t10 | t11 |

| SA₁ | ACC₃ | ACC₁ | ACC₃ | ACC₁ | ACC₃ | ACC₁ | ACC₃ | ACC₁ | ACC₁ | ACC₂ | ACC₂ | ACC₂ |
| SA₂ | ACC₂ | ACC₃ | ACC₁ | ACC₃ | ACC₁ | ACC₃ | | | | | | |
| t1 | t2 | t3 | t4 | t5 | t6 | t7 | t8 | t9 | t10 | t11 |

$T_S$

SYSTEM AND METHOD FOR ENABLING A DATA/VIDEO SERVER TO IMPLEMENT OPERATION IN ACCORDANCE WITH A NEW CONNECTION DIAGRAM, AND A DATA/VIDEO SERVER INCLUDING THAT SYSTEM

BACKGROUND OF THE INVENTION

1. Field of the Invention

The invention relates to a system and method which enable a data/video server to modify the bandwidth provided to one or more I/O (input/output) access channels coupled thereto. In particular, the invention relates a system and method which enable a data/video server to implement operation in accordance with a new connection diagram so that bandwidth requirement changes of one or more I/O access channels coupled thereto can be satisfied, and a data/video server including that system.

2. Description of the Related Art

Data/video servers such as the Media Pool video server developed by Philips Broadcast Television Systems Company (a division of Philips Electronics North America Corporation) contain a plurality of I/O (input/output) access channel connectors, a commutator and a plurality of storage arrays (each containing a plurality of disc drives therein) for use in storing and/or retrieving data from and/or to, respectively, one or more I/O access channels coupled to the I/O access channel connectors. The Media Pool video server, in particular, operates, via a control system (also contained therein), in accordance with the following rules of operation:

(1) Each individual I/O access channel connector is connected, via the commutator, to each of the storage arrays individually once in some sequence during a time period associated therewith, during which time period there may be one or more sub-periods in which that I/O access channel connector is not connected to a storage array (such connection of an I/O access channel connector to each of the storage arrays during such a time period is hereinafter referred to as a "CTA", i.e., connect-to-all). More particularly, each individual I/O access channel connector is connected, via the commutator, to each of the storage arrays individually once in a specific predetermined pattern (which is the same for all of the I/O access channel connectors) during a constant time period $T_b$ associated therewith, during which time period $T_b$ that I/O access channel connector is always connected to one of the storage arrays (such connection of an I/O access channel connector to each of the storage arrays during such a time period $T_b$ is hereinafter referred to as a "BLAST", which is sub-class of a CTA in which the pattern of connection is in accordance with a predetermined order and there are no sub-periods during that time period $T_b$ in which an I/O access channel connector associated therewith is not connected to a storage array. (Examples of CTAs and BLASTs are shown and discussed below in conjunction with FIG. 3.)

(2) Multiple I/O access channel connectors can be connected to multiple storage arrays at a time, but during that time only one of the I/O access channel connectors can be connected to a given one of the storage arrays, and only one of the storage arrays can be connected to a given one of the I/O access channel connectors.

(3) All of the I/O access channel connectors are individually connected to all of the storage arrays individually once during a constant time period $T_a$.

This manner of operation allows the I/O access channels coupled to a Media Pool video server to substantially simultaneously provide data for storage in the storage arrays, receive the same (or different) data from the storage arrays or a combination of both.

The initial Media Pool video server was a symmetrical server, i.e., it contained the same number of I/O access channel connectors and storage arrays. Its manner of operation included having, at all times, each of the I/O access channel connectors (a) connected to a different one of the storage arrays and (b) continuously involved in performing BLASTs. This, in turn, meant that during each successive non-overlapping time period $T_a=T_b$, associated with any one of the I/O access channel connectors, each of the I/O access channel connectors was individually connected to each of the storage arrays individually once in the same pattern. For a more detailed discussion of the initial (symmetrical) Media Pool video server, reference is made to U.S. Pat. No. 5,539,660 and U.S. application Ser. No. 08/389,672, filed Feb. 16, 1995, which are incorporated herein by reference.

Although the initial Media Pool video server optimized the usage of the I/O access channel connectors and the storage arrays (by always having each of the I/O access channel connectors connected to a different one of the storage arrays and involved in performing BLASTs), it failed to allow the bandwidth of the I/O access channels coupled to the I/O access channel connectors to be different. On the contrary, because of its manner of operation, the bandwidth of each of the I/O access channels coupled to the I/O access channel connectors of the initial Media Pool video server was the same.

This problem, however, has be solved by the introduction of a newer current Media Pool video server which can operate as an asymmetrical server, i.e., it can contain a different number of I/O access channel connectors and storage arrays. (It should be noted that the current Media Pool video server can also be operated as a symmetrical server as well, but it employs the operating mechanism discussed in the next paragraph.) Like the initial Media Pool video server, the current Media Pool video server also follows the above-mentioned rules of operation. However, because it is not possible in all cases for each of the I/O access channel connectors of an asymmetrical Media Pool video server to be connected to a different one of the storage arrays all of the time or to always be continuously involved in performing BLASTs, as was the case with the initial Media Pool video server, an operating mechanism was introduced which not only enables the current Media Pool video server to follow the above-mentioned rules, but also enables it to provide different bandwidth to different ones of the I/O access channels coupled thereto.

The operating mechanism by which the current Media Pool video server achieves the above is by operating the server during successive cycles, each having a time period $T_s$ ($\geq T_a$) (and hereinafter referred to as a supercycle"), in which in each supercycle each of the I/O access channel connectors is connected, via performing one or more CTAs (and to the extent possible, BLASTs), to each of the storage arrays for a sufficient amount of time so that each of the I/O access channels coupled to the I/O access channel connectors is provided with a sufficient amount of bandwidth to meet its needs during that supercycle. By operating in accordance with this mechanism, the current Media Pool video server can be programmed to operate in a manner whereby it provides different I/O access channels coupled thereto with different bandwidth. For a detailed description of this operating mechanism and an asymmetrical Media Pool video server, reference is made to the above-mentioned U.S. application Ser. No. 08/389,672 (see in particular FIGS. 11 and 12 and the discussion associated therewith).

Prior to the invention disclosed herein, it was believed that a current Media Pool video server needed to be programmed, prior to being brought on-line, i.e., booted-up, so that it would operate continuously in exactly the same manner supercycle after supercycle, i.e., in a static manner, until taken off-line. Furthermore, it was believed that when such a server was programmed, it had to be programmed, not only so that it would operate in a manner whereby it provides each of the I/O access channels with sufficient access, via the I/O access channel connectors, to the storage arrays during a supercycle to satisfy its bandwidth needs, but also, so that it would maximize the interconnections, via CTAs (and to the extent possible, BLASTs), of the I/O access channels connectors and storage arrays during that supercycle and leave little if any potential bandwidth unused during that supercycle. (Such a programming configuration can be represented by a connection diagram showing the number and placement of the CTAs and BLASTs performed by each of the I/O access channel connectors across the storage arrays during a supercycle. An example of such a diagram can be found in FIG. 12 of the above-mentioned U.S. application Ser. No. 08/389,672.)

The above-described static manner of operation of a current Media Pool video server and/or its operational programming to utilize substantially all of the potentially available bandwidth during a supercycle would have made it impossible for it to adapt to situations where the bandwidth needs of one or more of the I/O access channels coupled thereto change over time, e.g., when new or different applications are to be run, without having to be taken off-line and reconfigured. Shutting down a current Media Pool video server, reconfiguring it and then bringing it back on-line, i.e., rebooting it, to meet changing bandwidth needs of one or more of the I/O access channels coupled thereto is impractical, and in some situations unthinkable.

Accordingly, prior to the invention disclosed herein, there was a need to be able to change the operational programming configuration of the current Media Pool video server while on-line. Furthermore, it was realized that any such operational programming configuration change(s) would need to be done in a manner which would enable the current Media Pool video server to continue to operate properly during and after such operational programming configuration change(s).

SUMMARY OF THE INVENTION

The invention solves those needs by utilizing a system and a method which enable a data/video server of the current Media Pool video server type to implement operation in accordance with a new connection diagram (which can satisfy (changed) bandwidth needs of one or more of the I/O access channels coupled thereto) while on-line and in a manner which enables the server to continue to operate properly during and after such implementation. More particularly the invention provides a system and a method for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time. The system comprises: (a) a bandwidth manager for generating the new connection diagram; and (b) a control system, coupled to the bandwidth manager, for obtaining the new connection diagram and causing the server to implement operation in accordance with the new connection diagram. The method comprises (a) obtaining the new connection diagram; and (b) causing the server to implement operation in accordance with the new connection diagram.

The system (and in particular the control means thereof) and the method just described cause the server to implement operation in accordance with the new connection diagram in place of an old connection diagram at an implementation time by causing the server to begin operating in accordance with the new connection diagram at the implementation time, but subject to and in accordance with one or more transition rules, during the beginning of such operating, which ensure that there is a smooth operational transition between operation in accordance with the old connection diagram and operation in accordance with the new connection diagram. That system and that method further comprise a synchronizing means and step, respectively, for synchronizing each of the I/O access channel connectors, storage arrays and commutator so that they can implement operation in accordance with the new connection diagram at substantially the same time.

The invention is also directed to a data/video server. A data/video server in accordance with the invention comprises the following elements: (a) n I/O access channel connectors; (b) m storage arrays; and (c) a commutator which connects individual ones of the I/O access channel connectors to different individual ones of the storage arrays in accordance with a connection diagram with which the server is being operated in accordance with at a given time. In one embodiment, that server further comprises (d) a control system for obtaining a new connection diagram and causing the I/O access channel connectors, the storage arrays and the commutator to implement operation in accordance with the new connection diagram. In another embodiment, each of the elements of the server includes a microprocessor therein and one of the storage arrays further includes a bandwidth manager therein for generating a new connection diagram; wherein the microprocessors included in the elements obtain the new connection diagram and cause the elements to implement operation in accordance therewith in place of an old connection diagram at an implementation time by causing them to begin operating in accordance with the new connection diagram at the implementation time, but subject to and in accordance with one or more transition rules, during the beginning of such operating, which ensure that there is a smooth operational transition between operation in accordance with the old connection diagram and operation in accordance with the new connection diagram.

BRIEF DESCRIPTION OF THE DRAWINGS

The invention will now be described hereinafter in greater detail with reference to the following illustrative drawings, in which:

FIGS. 3–5 show connection diagrams which can be implemented by the server shown in FIG. 1.

DESCRIPTION OF THE PREFERRED EMBODIMENTS

Figure 1:
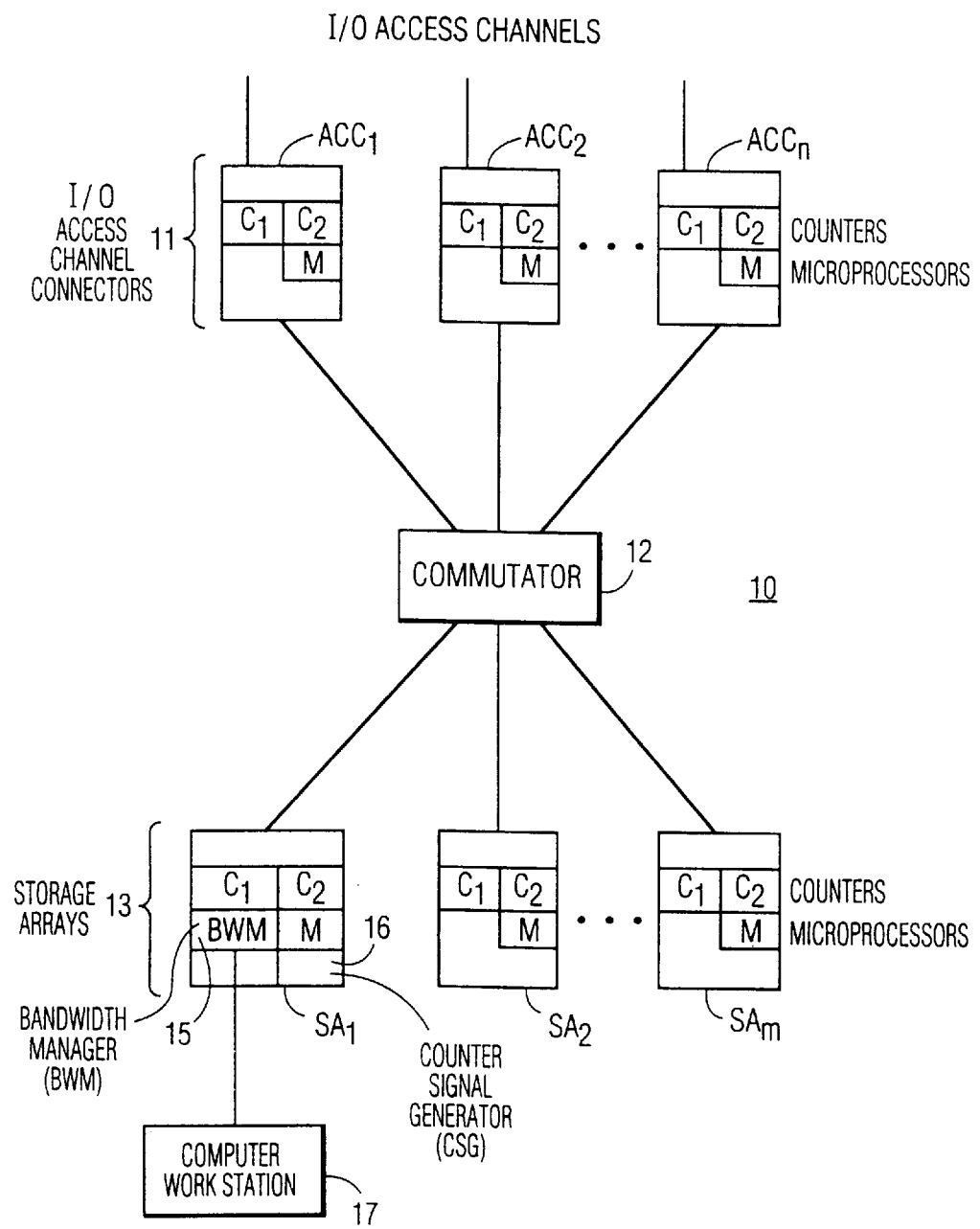
FIG. 1 shows a block diagram of a current Media Pool video server containing a system in accordance with the invention.

FIG. 1 shows a block diagram of a current Media Pool video server containing a system in accordance with the invention for enabling that server to implement operation in accordance with a new connection diagram. The Media Pool video server shown in FIG. 1, generally referenced by numeral 10 (and hereinafter referred to as "server 10"), includes (a) a plurality of I/O access channel connectors $ACC_1$ to $ACC_n$, generally and collectively referenced by numeral 11; (b) a commutator 12; and (c) a plurality of storage arrays $SA_1$ to $SA_m$, generally and collectively referenced by numeral 13. Commutator 12 is coupled to the I/O access channel connectors 11 and the storage arrays 13, and is designed to connect the appropriate ones of the I/O access channel connectors 11 individually to the appropriate ones of storage arrays 12 individually at the appropriate times in accordance with a connection diagram with which server 10 is to be operating in accordance with at a given time. FIG. 1 also shows each of the I/O access channel connectors 11 as being coupled to I/O access channels.

Each of the I/O access channel connectors 11, commutator 12 and the storage arrays 13 of FIG. 1 contains a microprocessor for controlling its operations, a first counter $C_1$ for counting supercycles and a second counter $C_2$ for counting the sub-periods of a supercycle. The first counter $C_1$ is designed to count to an extremely high number before being reset, while the second counter $C_2$ counts only as high as the number of sub-periods included in a supercycle and then resets. In addition, although not shown, each of the storage arrays 13 includes an array controller therein for controlling that array (in particular, the plurality of disk drives included therein (which are also not shown)).

The embodiment shown in FIG. 1 also shows storage array $SA_1$ as including a bandwidth manager (BWM) 15 therein. Since bandwidth manager 15 is a microprocessor, it is preferably part of the microprocessor M included in storage array $SA_1$. Further, it is noted that bandwidth manager 15 need not be included in storage array $SA_1$, but rather, could be included in any of the storage arrays 13, or it could be a separate from all of them, but coupled to at least one of them. However, it is preferable that bandwidth manager 15 be included in the storage array designated as the first blast storage array.

It should be noted at this point that all BLASTs involve a cycled connection of an I/O access channel connector to each of the storage arrays individually in accordance with a preselected order/pattern. More specifically, a BLAST starts with an I/O access channel connector being connected to the storage array designed as the first blast storage array, e.g., storage array $SA_1$; continues with that connector being successively and individually connected to each of the storage arrays designated as the subsequent sequentially designated blast storage arrays, e.g., storage arrays $SA_2$ through $SA_{m-1}$, respectively, in that order; and finishes with that connector being connected to the storage array designated as the last blast storage array, e.g., storage array $SA_m$. Hereinafter, it will be assumed that the connection cycle of a BLAST associated with an I/O access channel connector begins with connection of that connector to storage array $SA_1$, continues with connection of that connector successively and individually to each of the storage arrays $SA_2$ through $SA_{m-1}$ in that order, and ends with connection of that connector to storage array $SA_m$. It should be noted, however, that persons skilled in the art could devise other BLAST connection cycles and appropriately designate the appropriate storage arrays as the appropriate blast storage arrays.

FIG. 1 also shows a computer work station 17 (which is not a part of server 10, but is shown for convenience) being coupled to bandwidth manager 15, and a counter signal generator (CSG) 16 included in storage array $SA_1$. It is noted that counter signal generator 16, like the bandwidth manager 15, can be included in any of the storage arrays 13, or it can be separate from all of them, but coupled to at least one of them. However, it is preferably that counter signal generator 16 be included in the same storage array in which the bandwidth manager 15 is included. Furthermore, although not shown, each of the I/O access channel connectors 11, commutator 12 and the storage arrays 13 shown in FIG. 1 are connected to an ethernet bus, thereby coupling each of them to one another; and each of the counters $C_1$ and $C_2$ included in each of the I/O access channel connectors 11, the commutator 12 and the storage arrays 13 is connected to the counter signal generator 16, via a serial data transport control line (hereinafter referred to as the "SDT control line"), for receiving increment count signals.

When server 10 is first booted-up, it operates in accordance with a start-up connection diagram, i.e., during each supercycle, the I/O access channels connectors 11 are connected to the storage arrays 13, via commutator 12, in accordance with the start-up connection diagram. A start-up connection diagram is designed such that when server 10 operates in accordance therewith each of the I/O access channels has sufficient access, via the I/O access channel connectors 11, to the storage arrays 13 during each supercycle, i.e., time period $T_s$, to have sufficient bandwidth to operate in a preset manner.

It is preferable that all connection diagrams, including in particular, a start-up connection diagram, be such that during each supercycle, each I/O access channel connector performs at least two CTAs, one for control and/or audio information and one for video information. Further, in accordance with the invention, it is preferable that, to the extent possible, the start-up connection diagram not use all of the potential bandwidth available during a supercycle, but have space available to allow additional CTAs (or BLASTs) to be preformed within that supercycle so as to be able to accommodate increased bandwidth needs of the I/O access channels connected to the I/O access channel connectors 11. It must be noted that this is not an absolute requirement, but does guarantee that additional bandwidth can always be made available.

If for example one where to assume that server 10 contained 3 I/O access channel connectors 11 (i.e., n=3) and 2 storage arrays 13 (i.e., m=2), a sample start-up connection diagram could be the connection diagram shown in FIG. 3. The connection diagram shown in FIG. 3 shows the supercycle being divided into 11 sub-period, $t_1$–$t_{11}$; and contains 6 CTAs (e.g., connection of $ACC_1$ to $SA_1$ and $SA_2$ during sub-periods $t_1$ and $t_2$, connection of $ACC_3$ to $SA_1$ and $SA_2$ during sub-periods $t_1$–$t_9$, etc.) and 5 BLASTs (e.g., connection of $ACC_1$ to $SA_1$ and $SA_2$ during sub-periods $t_1$ and $t_2$, connection of $ACC_3$ to $SA_1$ and $SA_2$ during sub-periods $t_9$ and $t_{10}$, etc.), of which 4 of the CTAs and 4 of the BLASTs are the same. Furthermore, it is noted that the connection diagram shown in FIG. 3 does not use up all of the potential bandwidth available during the supercycle. Rather, it provides the ability for 5 additional CTAs or BLASTs to be performed, allowing additional bandwidth to be provided to one or more of the I/O access channels connected to the I/O access channel connectors $ACC_1$ through $ACC_3$.

It should be noted at this point that the only CTAs within a supercycle which are not or do not correspond to BLASTs are those in which the first connection of an I/O access channel connector to a storage array during that supercycle is not to the storage array designated as the first blast storage array. (In the example shown in FIG. 3, that is the case with respect to I/O access channel connector $ACC_3$.) In view of this, it must be noted that it is preferable that a supercycle have a number of sub-periods which is a multiple of the number of storage arrays, i.e., m, included in server 10, and further that, to the extent possible, all CTAs within a supercycle be BLASTs (which should be possible as long as a connection diagram has additional bandwidth available for a supercycle). (In this regard, it should be noted that the example shown in FIG. 3 is not a preferred connection diagram. It was chosen, however, because it enables discussion of certain aspects of the invention.)

When server 10 is booted-up, the microprocessor M included in each of the storage arrays 13 generates a start-up connection diagram for that storage array. Before discussing anything further about those start-up connection diagrams, it is important to understand another important concept about a connection diagram such as the one shown in FIG. 3.

A careful look at the connection diagram shown in FIG. 3 reveals that both the first and second rows thereof contain the same sequence, but offset, i.e., shifted, from one another by one sub-period of the supercycle. Furthermore, it should be clear that the first row indicates which I/O access channel connector storage array $SA_1$ is connected to during which of sub-periods of the supercycle, and the second row indicates which I/O access channel connector storage array $SA_2$ is connected to during which of the sub-periods of the supercycle. If the connection diagram shown in FIG. 3 were considered to be a greater connection diagram, i.e., a connection diagram which shows all of the connections of all of the I/O access channel connectors to all of the storage array during a supercycle, and each of its rows were individually considered to be a local connection diagram of the (same) greater connection diagram, i.e., a connection diagram which shows only those portion, i.e. the connections, of the greater connection diagram which pertain to it, it should also be clear that a local connection diagram can convey essentially the same information as a greater connection diagram, and the two can be considered to be essentially the same.

Since less overall total physical information (i.e., the same information without redundancy) needs to be dealt with if an element operates in association with a local connection diagram rather then the greater connection diagram to which it pertain per se, when server 10 is booted-up, the microprocessor M included in each of the storage arrays 13 generates a local start-up connection diagram which pertains to the same greater start-up connection diagram for that storage array. (Alternatively, as should be clear, each could generate the same greater start-up connection diagram).

The microprocessor M in each of the storage arrays 13 knows how to generate the appropriate local start-up connection diagrams for the same greater start-up connection diagram (or the same greater connection diagram) in a manner known to persons skilled in the art. To aid in doing this, the microprocessor M in each of the storage arrays 13 knows the length of the supercycle, i.e., how many sub-periods are to included therein.

After the microprocessors M included in the storage arrays 13 have generated their local start-up connection diagrams, the microprocessor M included in storage array $SA_1$ provides the microprocessor M included in each of the I/O access channel connectors 11 and commutator 12 with its local start-up connection diagram, which again is essentially the same as providing each of them with the greater start-up connection diagram. From that, the microprocessor M included in each of the I/O access channel connectors 11 and commutator 12 are able to generate their own local start-up connection diagrams. It should be noted that the microprocessor M included in any of the storage arrays 13 could provide the microprocessor M included in the each of the I/O access channel connectors 11 and commutator 12 with its local start-up connection diagram.

Once all of the I/O access channel connectors 11, commutator 12 and the storage arrays 13 have obtained their local start-up connection diagrams (or the greater start-up connection diagram), the count on each of their counters $C_1$ and $C_2$ are set to zero. (Since a local connection diagram and a greater connection diagram can provide essentially the same information, i.e., which I/O access channel(s) are to be individually connected to which storage array(s) individually at what time, they are hereinafter again generically referred to simply as a connection diagram). Then the microprocessor M included in storage array $SA_1$ gives the command to begin operation, and server 10 begins to operate in accordance with the start-up connection diagram.

The microprocessors M included in the I/O access channel connectors 11, commutator 12 and the storage arrays 13 make sure that server 10 operates in accordance with the connection diagram, including the start-up connection diagram, with which it is to be operated in accordance with at a given time. The operation of those microprocessors M in carrying out that function can be thought as a (and will hereinafter be referred to as the) "control system". In view of this, it is noted that the microprocessors M making up the control system do not need to be included in the I/O access channel connectors 11, commutator 12 and storage arrays 13, but alternatively, could be a separate single microprocessor which is coupled to each to perform the function just described and the functions described below.

Furthermore, during such operation (i.e., operation of server 10 in accordance with a connection diagram), counter generator 16, supplies each of the I/O access channel connectors 11, commutator 12 and the storage arrays 13, via the SDT control line, with (a) an increment count signal to increment the counter $C_2$ included therein each time storage array $SA_1$ indicates that a sub-period has occurred, and (b) an increment count signal to increment the counter $C_1$ included therein each time storage array $SA_1$ indicates that a supercycle has been completed. It is noted that the counters $C_1$ and $C_2$, included in each of the I/O access channel connectors 11, commutator 12 and storage arrays 13, aid the microprocessor M included therein in ensuring that server 10 operates in accordance with the connection diagram with which it is to be operated in accordance with at a given time.

It should be noted that when server 10 first begins operation, i.e., is booted-up, the control system operates to prohibit any of the I/O access channel connectors from initially connecting to any of the storage arrays, except in conjunction with performing a BLAST. Accordingly, if the start-up connection diagram is the connection diagram shown in FIG. 3, during the first supercycle only, the control system will operate to prohibit I/O access channel connector $ACC_3$ from being connected to storage array $SA_2$ during sub-period $t_1$. Thereafter, that connection diagram will be followed exactly as it is shown.

So long as the bandwidth requirements of the I/O access channels coupled to the I/O access channel connectors 11 do not change, server 10 will continue to operate in accordance with the connection diagram it is currently operating in accordance with, e.g., the start-up connection diagram, supercycle after supercycle. However, when bandwidth needs of one or more of the I/O access channels coupled to the I/O access channel connectors 11 requires a change (i.e., it requires more or less bandwidth), e.g., when one or more new or different applications is to be run in conjunction therewith, server 10 is designed to enable, in accordance with the invention, if appropriate, a new connection diagram to be obtained for that situation and implemented so that the changed needs are satisfied.

Figure 2:
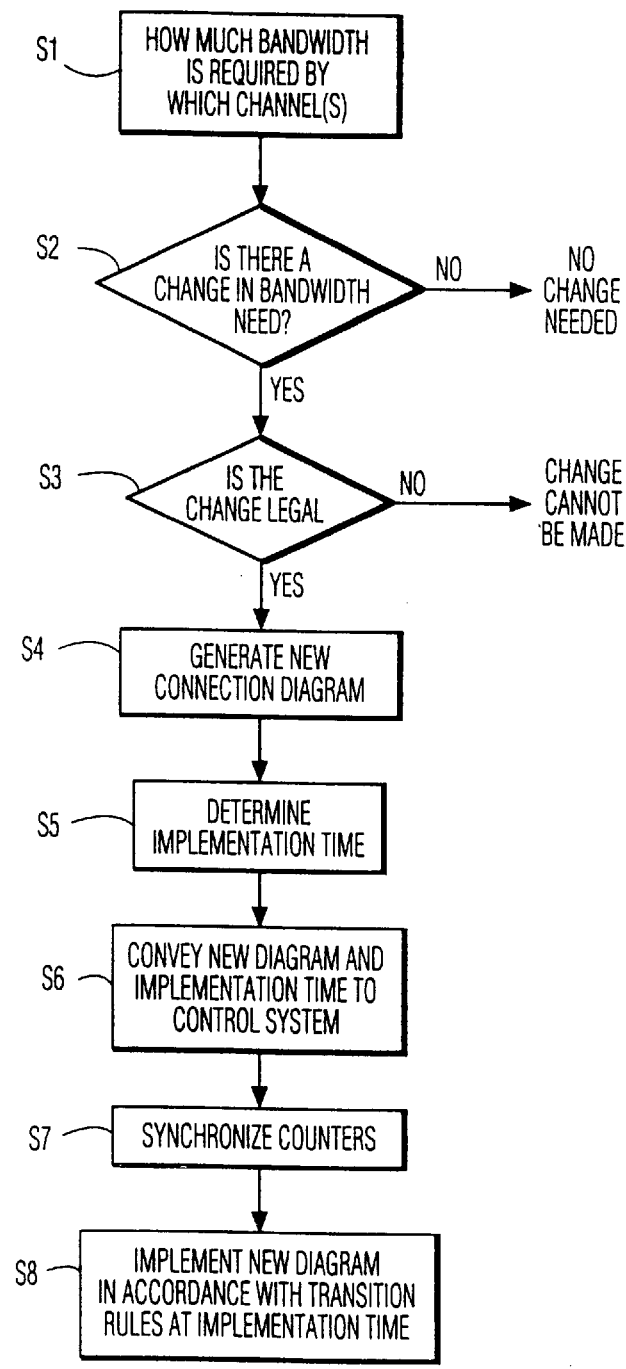
FIG. 2 shows a block diagram of a method in accordance with the invention for obtaining and implementing a new connection diagram which can be carried out by the, server shown in FIG. 1.

FIG. 2 shows a block diagram of a method in accordance with the invention for obtaining and implementing a new connection diagram. It is noted that steps S1 through S3 thereof pertain primarily to a method of determining whether a new connection diagram for server 10 should be generated, and steps S4 through S8 thereof pertain primarily to a method for enabling server 10 to implement operation in accordance with a new connection diagram.

The potential need for a bandwidth change to an I/O access channel coupled to server 10 is initiated by work station 17. Typically, this occurs when a user indicates, via work station 17, that he or she wants a new or different application to be run in conjunction with one of the I/O access channels coupled to one of the I/O access channel connectors 11.

In accordance with step S1 of the method shown in FIG. 2, if a user requests, by means of work station 17, that a new or different application be run in conjunction with one of the I/O access channels coupled to server 10, work station 17 sends a bandwidth need command to bandwidth manager 15. That command indicates how much bandwidth is required to run that application and on which I/O access channel that application is to be run. (The latter is usually indicated by indicating the I/O access channel connector to which that I/O access channel is coupled.) In accordance with step S2 of the method shown in FIG. 2, bandwidth manager 15 then compares the current bandwidth being provided to that I/O access channel, on the basis of the current connection diagram with which server 10 is operating in accordance with, with the bandwidth currently being provided thereto to determine if there is a bandwidth requirement change. Bandwidth manager 15 either stores that diagram therein or has access thereto from the microprocessor M included in storage array $SA_1$.

If bandwidth manager 15 determines that there is no bandwidth requirement change, then it informs work station 17 that no changes are necessary and that the new or different application can be begin whenever appropriate. However, if bandwidth manager 15 determines that there is a bandwidth requirement change, then, in accordance with step S3 of the method shown in FIG. 4, it determines if that change can be made, i.e., if that change is legal.

If the bandwidth change involves less bandwidth, then it is presumed to be legal. (It is noted that there are exception, however) However, if the bandwidth change involves the need for more bandwidth, then a full legality determination is made. That determination involves determining whether sufficient additional bandwidth is available during the supercycle to meet the increased bandwidth needs of the I/O access channel needing the same without violating any preset allocation rules, such as those described above (e.g., that each I/O access channel connector obtain at least two CTAs during a supercycle), or interrupting or interfering with existing system application(s) which is/are currently be running (e.g., without making any bandwidth changes to the I/O access channel(s) being used with that/those application (s)).

If bandwidth manager 15 determines that a requested bandwidth change is not legal, e.g., because insufficient bandwidth is available to satisfy the additionally requested bandwidth need, it will inform work station 17 of this fact. Thereafter, work station 17 will indicate that the new or different application which a user wishes to run cannot be run at the current time (on the requested I/O access channel).

If bandwidth manager 15 determines that a requested bandwidth change is legal, it informs work station 17 that the new or different application can be run (on the requested I/O access channel). Thereafter, in accordance with step S4 of the method shown in FIG. 2, it generates a new connection diagram which will satisfy the changed bandwidth needs.

It is noted that bandwidth manager 15 in generating the new connection diagram preferably generates a local new connection diagram and not a greater new connection diagram for the element in which it is included (or coupled to), which in accordance with the example discussed herein (in conjunction with FIG. 1) is storage array $SA_1$. However, as indicated above, it should be remembered that there is essentially no difference in terms of information which is conveyed by a local connection diagram and a greater connection diagram, for a greater connection diagram and the corresponding local connection diagrams which pertain thereto for other elements of server 10 can easily be obtained from that local connection diagram.

Bandwidth manager 15 contains sufficient information to be able to generate an appropriate (new) connection diagram in accordance with a manner known to those skilled in the art which will satisfy the changed bandwidth requirements and not violate any of the preset allocation rules, or interrupt or interfere with an existing system application(s) being currently run. Accordingly, bandwidth manager 15, in addition to having or accessing the connection diagram with which server 10 is currently operating in accordance with, stores the present allocation rules and the length of the supercycle, i.e., number of sub-periods, therein.

After the new connection diagram has been generated, in accordance with step S5 of the method shown in FIG. 2, bandwidth manager 15 determines at what time (hereinafter referred to as the "implementation time") server 10 should implement operation in accordance with the new connection diagram in place of the old connection diagram, i.e., the connection diagram with which server 10 is currently operating in accordance with. Bandwidth manager 15 does this by (a) obtaining the current supercycle count value of the counter $C_1$ included in storage array $SA_1$, and (b) selecting a supercycle count value which will occur in the immediate future (e.g., 15 supercycle count values higher), but which will allow sufficient time for the new connection diagram to be conveyed to the appropriate elements and for those elements to be synchronized (as described hereinafter). Accordingly, it is noted that the implementation time corresponds with the end of one supercycle and the beginning of another.

Once the implementation time has been determined, in accordance with step S6 of the method shown in FIG. 2, bandwidth manner 15 makes sure that the new connection diagram and the implementation time are conveyed, via the ethernet, to the control system, i.e., the microprocessor M included in each of the I/O access channel connectors 11, commutator 12 and the storage arrays 13. (It should be noted that if the microprocessor M included in storage array $SA_1$ includes bandwidth manager 15, there is no need to convey this information thereto directly because it already possess that information.) It is noted that in a preferred embodiment, regardless of whether a local new connection diagram or a greater new connection diagram is conveyed to the microprocessors M of the I/O access channel connectors 11, commutator 12 and storage array 13, each obtains a local new connection diagram therefrom which applies to it to aid it in ensuring that it operates in accordance with the new connection diagram when and as appropriate.

Following the conveyance of the new connection diagram and the implementation time to the control system, in accordance with step S7 of the method shown in FIG. 2, microprocessor M included in each of the I/O access channel connectors 11, commutator 12 and storage arrays $SA_2$ through $SA_m$ cause both of the counters $C_1$ and $C_2$ included therein to become synchronized with the counters $C_1$ and $C_2$ included in storage array $SA_1$. This is done so that when the count value which corresponds to the implementation time is incremented to by the counter $C_1$ included in storage array $SA_1$, all counters $C_1$ and $C_2$ are in sync.

Finally, when the implementation time is reached, i.e., the counter $C_1$ included in each of the I/O access channel connectors 11, commutator 12 and storage arrays 13 are incremented to the count value which corresponds to the implementation time, in accordance with step S8 of the method shown in FIG. 2, the control system, i.e., the microprocessor M included in each, causes each to substantially simultaneously implement operation in accordance with the new connection diagram in place of the old connection diagram. More specifically, the control system causes each of the I/O access channel connectors 11, commutator 12 and storage arrays 13 to substantially simultaneously begin operating in accordance with the new connection diagram, but subject to and in accordance with certain transition rules, during the beginning of such operating, which ensure that a smooth operational transition occurs. The transition rules, as such, ensure that server 10 continues to operate properly during and immediately following such transition.

The transition rules apply to and are followed during the first supercycle (hereinafter referred to as the "transition supercycle") which occurs immediately following the implementation time. Since, as stated above, the implementation time corresponds to the beginning of a supercycle, the implementation time corresponds to the beginning of the transition supercycle.

The transition rules include the following:
(1) An I/O access channel connector cannot start following that portion of the new connection diagram which applies to it until it has completed any BLAST associated therewith which has been started but not yet completed when the implementation time occurs (i.e., any BLAST which has begun during an old supercycle must be allowed to be completed).
(2) An I/O access channel connector must ignore that portion of the new connection diagram which applies to it which requires it to be connected to any storage array, other than the storage array designated as the first blast storage array, prior to being connected to the storage array designated as the first blast storage array (i.e., an I/O access channel connector must begin its connections to the storage arrays in accordance with a new connection diagram by performing a BLAST).
(3) A storage array must ignore that portion of the new connection diagram which applies to it during the first X-1 sub-periods following the implementation time and follow the old connection diagram during such first X-1 sub-periods, where X corresponds to the position within a BLAST in which that storage array is designated to be (e.g., storage array $SA_2$ (where X=2) would ignore the first column of that portion of the new connection diagram which applies to it and follow the first column of the old connection diagram which applies to it).
(4) A storage array cannot be connected to the same I/O access channel connector until m sub-period of time later (e.g., storage array $SA_1$ (where m=2) cannot be connected to I/O access channel connector $ACC_1$ if it is currently connected to thereto until 2 sub-periods later).

Furthermore, the following transition rules are stored in the following microprocessors M to enable that the control system ensure that they are properly followed by the I/O access channel connectors 11, commutator 12 and storage arrays 13 during the transition supercycle: (a) transition rules (1) and (2) are stored in the microprocessor M included in each of the I/O access channel connectors 11; (b) transition rules (1) through (4) are stored in the microprocessor M included in the commutator 12; and (c) transition rules (3) and (4) are stored in the microprocessor M included in each of the storage arrays 13. It is noted also noted that the control system makes sure that I/O access channel connectors 11, commutator 12 and storage arrays 13 operate in accordance with the transition rules during the transition supercycle with the aid of the counters $C_2$, which indicate which sub-period thereof is occurring when.

In order to better understand the invention, the transition rules and how the transition rules affect implementation of operation in accordance with a new connection diagram, an example involving a bandwidth increase is discussed hereinafter to specifically show what occurs during the beginning of such operation, i.e., what occurs during the transition supercycle, and thereafter. In this example, it is assumed that server 10 has 3 I/O access channel connectors (n=3) and 2 storage arrays (m=2) and is (currently) operating in accordance with the (old) connection diagram shown in FIG. 3, as in the example discussed above, and further that additional bandwidth is to be provided to the I/O access channels coupled to I/O access channel connectors $ACC_1$ and $ACC_3$ in accordance with the (new) connection diagram shown in FIG. 5. As a result of the transition rules, during the transition supercycle, the connection diagram (hereinafter referred to as the "transition connection diagram") which is operated in accordance therewith in that situation would look like the connection diagram shown in FIG. 4. Thereafter, the connection diagram shown in FIG. 5 would be followed as it is shown during each subsequent supercycle (unless implementation of operation in accordance with another new connection diagram in its place occurs).

The connection diagram shown in FIG. 4 result from and shows operation of all four transition rules. Since the old connection diagram, i.e., FIG. 3, shows that I/O access channel connector $ACC_3$ beginning a BLAST at sub-period $t_{11}$, i.e., at the end thereof, in accordance with rule (1), that I/O access channel connector must be allowed to complete its BLAST prior to following the new connection diagram, i.e., FIG. 5. Accordingly, during sub-period $t_1$ of the transition connection diagram, I/O access channel connector $ACC_3$ is connected to storage array $SA_2$. Further, since the new connection diagram shows I/O access channel connector $ACC_2$ being connected to storage array $SA_2$ prior to being connected to storage array $SA_1$, in accordance with transition rule (2), the connection of that I/O access channel connector to storage array $SA_2$ during sub-period $t_1$ is ignored. The connection of I/O access channel connector $ACC_3$ to storage array $SA_2$ replaces that connection during the sub-period $t_1$ of the transition connection diagram. This demonstrates that fact that rules (1) and (2) are complementary. Further, in accordance with rule (3), the transition connection diagram shows that with respect to storage array $SA_2$ (where X=2), the first (2−1) sub-period of the new connection diagram which applies thereto is ignored following the implementation time, and the old connection diagram during such sub-period is followed. More specifically, during period $t_1$ of the transition connection diagram, storage array $SA_2$ is connected to I/O access channel connector $ACC_3$, in accordance with the old connection diagram, instead of I/O access channel connector $ACC_2$, in accordance with the new connection diagram. This demonstrates that fact that rule (3) provides a parallel result to rules (1) and (2). Still further, since the old connection diagram ends with I/O access channel connector $ACC_3$ being coupled to storage array $SA_1$ and the new connection diagram begins with I/O access channel connector $ACC_3$ being coupled to storage array $SA_1$, which is not m sub-periods latter (i.e., in this example 2 sub-periods), rule (4) requires that the connection of I/O access channel connector $ACC_3$ to storage array $SA_1$ during sub-period $t_1$ of the new connection diagram to be ignored and not made during the transition connection diagram. Finally, because rules (1) and (3) require I/O access channel connector $ACC_3$ to be connected to storage array $SA_2$ during sub-period $t_1$ of the transition connection diagram, rule (4) also prohibit the connection of I/O access channel connector $ACC_3$ from being connected to storage array $SA_3$ during sub-period $t_2$ in accordance with the new connection diagram in the transition connection diagram, for that connection would not be occurring m sub-periods latter (i.e., 2 sub-periods latter). As a result, no connection is made to storage array $SA_2$ during sub-period $t_2$ of the transition connection diagram.

It is noted that aside from the changes made to the first two sub-periods of the transition connection diagram in the example provided above, the rest of the transition connection diagram is exactly the same as the new connection diagram. This means that the true transition from operation in accordance with the old connection diagram to operation in accordance with the new connection diagram in that situation only really involved two sub-periods of the transition supercycle. Accordingly, it should be clear that in the example provided above, the new connection diagram is followed exactly as it is shown during the subsequent supercycles which follow the transition supercycle (unless, of course, implementation of operation in accordance with another new connection diagram in its place occurs).

Although the discussions above have focused primarily on Media Pool video servers, and in particular, a current Media Pool video server having 3 I/O access channel connectors (n=3) and 2 storage arrays (m=2), the invention is not limited to a current Media Pool video server or aforementioned configuration. The principals discussed above can easily be applied by one skilled in the art to different configurations (i.e., different values of n and m) of a current Media Pool video server. Furthermore, the invention can be applied to data/video server or any other device which employs use of one or more I/O access channel connectors, one or more storage arrays and a commutator which connects individual one of the I/O access channel connectors to different individual ones of the storage arrays in some changing manner.

I claim:

1. A system for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a present connection diagram with which the server is being operated in accordance with at a given time, the system comprising:

a bandwidth manager for generating the new connection diagram, at least one of the I/O access channel connectors being coupled to an I/O access channel, and the new connection diagram being designed to enable the server when operating in accordance therewith to provide that I/O access channel with a different bandwidth during a supercycle time period than it is provided with when the server operates in accordance with the present connection diagram; and a control system, coupled to the bandwidth manager, for obtaining the new connection diagram and causing the server to implement operation in accordance with the new connection diagram.

2. The system as claimed in claim 1, wherein the control system causes the server to implement operation in accordance with the new connection diagram in place of the present connection diagram at an implementation time by causing the server to begin operating in accordance with the new connection diagram at the implementation time, but subject to and in accordance with one or more transition rules, during the beginning of such operating, which ensure that there is a smooth operational transition between operation in accordance with the present connection diagram and operation in accordance with the new connection diagram.

3. A system for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time, the system comprising:

a bandwidth manager for generating the new connection diagram; and a control system, coupled to the bandwidth manager, for obtaining the new connection diagram and causing the server to implement operation in accordance with the new connection diagram, wherein the control system causes the server to implement operation in accordance with the new connection diagram in place of an old connection diagram at an implementation time by causing the server to begin operating in accordance with the new connection diagram at the implementation time, but subject to and in accordance with one or more transition rules, during the beginning of such operating, which ensure that there is a smooth operational transition between operation in accordance with the old connection diagram and operation in accordance with the new connection diagram, and wherein the control system ensures that operation of the server in accordance with the new connection diagram is subject to and in accordance with the one or more transition rules during at least the beginning of a transition time period which begins at the implementation time, which thereby results in the server operating in accordance with a transition connection diagram during the transition time period which may differ from the new connection diagram.

4. The system as claimed in claim 3, wherein the control system is made up of a plurality of microprocessors individually included in different ones of the I/O access channel connectors, storage arrays and commutator for causing them to operate in accordance with the transition connection diagram during the transition time period and the new connection diagram subsequent thereto.

5. The system as claimed in claim 4, further comprising synchronizing means for synchronizing each of the I/O access channel connectors, storage arrays and commutator so that they begin operating in accordance with the transition connection diagram substantially simultaneously at the implementation time.

6. The system as claimed in claim 5, wherein the bandwidth manager determines the implementation time, and the control systems causes the synchronizing means to synchronize each of the I/O access channel connectors, storage arrays and commutator upon obtaining the new connection diagram and the implementation time.

7. The system as claimed in claim 3, further comprising a plurality of counters which aid the control system in ensuring that the server operates in accordance with the one or more transition rules during at least the beginning of the transition time period.

8. The system as claimed in claim 3, wherein the server operates in a manner whereby each individual one of the I/O access channel connectors is connected, via the commutator, in a specific predetermined pattern to each of the storage arrays individually once during a specific constant time period associated therewith, during which time period that I/O access channel connector is always connected to one of the storage arrays; and the one or more transition rules ensure that each of the I/O access channel connectors individually is or continues to be connected to the storage arrays in accordance with that pattern, and that pattern alone, subsequent to the implementation time regardless of whether that pattern of connections begins prior to or during the transition time period.

9. The system as claimed in claim 2, wherein the new and the present connection diagrams provide information indicating which one(s) of the I/O access channel connectors should be individually connected to which one(s) of the storage arrays individually during successive sub-periods of a time period, and the one or more transition rules include one or more of the following rules:

(a) an I/O access channel connector cannot start following that portion of the new connection diagram which applies to it until it has completed any BLAST associated therewith which has been started but not yet completed when the implementation time occurs;

(b) an I/O access channel connector must ignore that portion of the new connection diagram which applies to it which requires it to be connected to any storage array, other than a storage array designated as a first blast storage array, prior to being connected to the storage array designated as the first blast storage array;

(c) a storage array must ignore that portion of the new connection diagram which applies to it during the first X−1 sub-periods thereof following the implementation time and follow the present connection diagram during such first X−1 sub-periods, where X corresponds to the position within a BLAST in which that storage array is designated to be; and/or (d) a storage array cannot be connected to the same I/O access channel connector until m sub-period of time later.

10. A system for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time, the system comprising:

a bandwidth manager for generating the new connection diagram; and a control system, coupled to the bandwidth manager, for obtaining the new connection diagram and causing the server to implement operation in accordance with the new connection diagram, wherein the control system causes the server to implement operation in accordance with the new connection diagram in place of an old connection diagram at an implementation time by causing the server to begin operating in accordance with the new connection diagram at the implementation time, but subject to and in accordance with one or more transition rules, during the beginning of such operating, which ensure that there is a smooth operational transition between operation in accordance with the old connection diagram and operation in accordance with the new connection diagram, and wherein the bandwidth manager determines the implementation time and supplies it to the control system.

11. A system for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time, the system comprising:

a bandwidth manager for generating the new connection diagram;

a control system, coupled to the bandwidth manager, for obtaining the new connection diagram and causing the server to implement operation in accordance with the new connection diagram; and synchronizing means for synchronizing each of the I/O access channel connectors, storage arrays and commutator so that they can implement operation in accordance with the new connection diagram at substantially the same time.

12. The system as claimed in claim 11, wherein the synchronization means comprises a plurality of counters.

13. A system for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time, the system comprising:

a bandwidth manager for generating the new connection diagram; and a control system, coupled to the bandwidth manager, for obtaining the new connection diagram and causing the server to implement operation in accordance with the new connection diagram, wherein the bandwidth manager generates a new connection diagram which ensures that when the server operates in accordance therewith, each of the I/O access channel connectors is individually connected to each of the storage arrays individually at least twice during a supercycle time period.

14. A method for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a present connection diagram with which the server is being operated in accordance with at a given time, the system comprising:

obtaining a new connection diagram, the new connection diagram being designed to enable the server when operating in accordance therewith to provide an I/O access channel already coupled to one of the I/O access channel connectors with a different bandwidth during a supercycle time period than said I/O access channel is provided with when the server operates in accordance with the present connection diagram; and causing the server to implement operation in accordance with the new connection diagram.

15. The method as claimed in claim 14, wherein the server is caused to implement operation in accordance with the new connection diagram in place of the present connection diagram at an implementation time by causing the server to begin operating in accordance with the new connection diagram at the implementation time, but subject to and in accordance with one or more transition rules, during the beginning of such operating, which ensure that there is a smooth operational transition between operation in accordance with the present connection diagram and operation in accordance with the new connection diagram.

16. The method as claimed in claim 15, wherein the new and the present connection diagrams provide information indicating which one(s) of the I/O access channel connectors should be individually connected to which one(s) of the storage arrays individually during successive sub-periods of a time period, and the one or more transition rules include one or more of the following rules:

(a) an I/O access channel connector cannot start following that portion of the new connection diagram which applies to it until it has completed any BLAST associated therewith which has been started but not yet completed when the implementation time occurs;

(b) an I/O access channel connector must ignore that portion of the new connection diagram which applies to it which requires it to be connected to any storage array, other than a storage array designated as a first blast storage array, prior to being connected to the storage array designated as the first blast storage array;

(c) a storage array must ignore that portion of the new connection diagram which applies to it during the first X-1 sub-periods thereof following the implementation time and follow the present connection diagram during such first X-1 sub-periods, where X corresponds to the position within a BLAST in which that storage array is designed to be; and/or (d) a storage array cannot be connected to the same I/O access channel connector until m sub-period of time later.

17. A method for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time, the system comprising:

obtaining a new connection diagram;

determining an implementation time; and causing the server to implement operation in accordance with the new connection diagram, wherein the server is caused to implement operation in accordance with the new connection diagram in place of an old connection diagram at the implementation time by causing the server to begin operating in accordance with the new connection diagram at the implementation time, but subject to and in accordance with one or more transition rules, during the beginning of such operating, which ensure that there is a smooth operational transition between operation in accordance with the old connection diagram and operation in accordance with the new connection diagram.

18. The method as claimed in claim 17, wherein information about the new connection diagram and the implementation time is conveyed to the I/O access channel connectors, storage array and commutator so that they implement operation in accordance with the new connection diagram at the implementation time.

19. The method as claimed in claim 18, further comprising synchronizing each of the I/O access channel connectors, storage arrays and commutator so that they can implement operation in accordance with the new connection diagram substantially simultaneously at the implementation time.

20. A method for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time, the system comprising:

obtaining a new connection diagram;

causing the server to implement operation in accordance with the new connection diagram; and synchronizing each of the I/O access channel connectors, storage arrays and commutator so that they can implement operation in accordance with the new connection diagram at substantially the same time.

21. A method for enabling a data/video server to implement operation in accordance with a new connection diagram, which server includes n I/O access channel connectors, m storage arrays and a commutator which connects individual ones of the I/O access channel connectors to different individual ones of the storage arrays in accordance with a connection diagram with which the server is being operated in accordance with at a given time, the system comprising:

obtaining a new connection diagram, wherein the new connection diagram is obtained by being generated by a device which can generate one or more new connection diagrams; and causing the server to implement operation in accordance with the new connection diagram.

22. The method as claimed in claim 21, wherein the new connection diagram is generated only if when generated it would enable the server when operating in accordance therewith to provide one or more I/O access channels coupled thereto each with sufficient bandwidth to satisfy its needs during a supercycle time period without violating any preset allocation rules or interrupting or interfering with any existing application(s) currently being run in conjunction with those I/O access channels which is intended to continue being run when and if the server is operated in accordance with the new connection diagram.

23. The method as claimed in claim 21, wherein the server is coupled to one or more I/O access channels, and the method is used in conjunction with a user wishing to run a new application in conjunction with at least one of the I/O access channels, in which case the method further comprises:

determining how much bandwidth is required to be supplied to the at least one I/O access channel during a supercycle time period to run the new application;

determining whether the bandwidth which is required to be supplied to the at least one I/O access channel during a supercycle time period to run the new application is different from the bandwidth currently being provided to that I/O access channel during a supercycle time period, in which case, if it is not, then the new connection diagram is not generated; and if the bandwidth which is required to be supplied to the at least one I/O access channel during a supercycle time period to run the new application is different from the bandwidth currently being provided to that I/O access channel during a supercycle time period, determining whether the new connection diagram can be generated so that it will enable the server when operating in accordance therewith to provide each of the I/O access channels with sufficient bandwidth to satisfy its needs during a supercycle time period without violating any preset allocation rules or interrupting or interfering with any existing application(s) currently being run in conjunction with those I/O access channels which is intended to continue being run when and if the server is operated in accordance with the new connection diagram, if it cannot be, then the new connection diagram is not generated.

24. A data/video server, comprising:

n I/O access channel connectors;

m storage arrays;

a commutator which connects individual ones of the I/O access channel connectors to different individual ones of the storage arrays in accordance with a present connection diagram with which the server is being operated in accordance with at a given time; and a control system for obtaining a new connection diagram and causing the I/O access channel connectors, the storage arrays and the commutator to implement operation in accordance with the new connection diagram, the new connection diagram being designed to enable the server when operating in accordance therewith to provide an I/O access channel already coupled to one of the I/O access channel connectors with a different bandwidth during a supercycle time period than said I/O access channel is provided with when the server operates in accordance with the present connection diagram.

25. The server as claimed in claim 24, wherein the control system causes the server to implement operation in accordance with the new connection diagram in place of the present connection diagram at an implementation time by causing the server to begin operating in accordance with the new connection diagram at the implementation time, but subject to and in accordance with one or more transition rules, during the beginning of such operating, which ensure that there is a smooth operational transition between operation in accordance with the present connection diagram and operation in accordance with the new connection diagram.

26. The system as claimed in claim 25, wherein the new and the present connection diagrams provide information indicating which one(s) of the I/O access channel connectors should be individually connected to which one(s) of the storage arrays individually during successive sub-periods of a time period, and the one or more transition rules include one or more of the following rules:

(a) an I/O access channel connector cannot start following that portion of the new connection diagram which applies to it until it has completed any BLAST associated therewith which has been started but not yet completed when the implementation time occurs;

(b) an I/O access channel connector must ignore that portion of the new connection diagram which applies to it which requires it to be connected to any storage array, other than a storage array designated as a first blast storage array, prior to being connected to the storage array designated as the first blast storage array;

(c) a storage array must ignore that portion of the new connection diagram which applies to it during the first X−1 sub-periods thereof following the implementation time and follow the present connection diagram during such first X−1 sub-periods, where X corresponds to the position within a BLAST in which that storage array is designated to be; and/or (d) a storage array cannot be connected to the same I/O access channel connector until m sub-period of time later.

27. A data/video server, comprising:

n I/O access channel connectors;

m storage arrays;

a commutator which connects individual ones of the I/O access channel connectors to different individual ones of the storage arrays in accordance with a connection diagram with which the server is being operated in accordance with at a given time;

a control system for obtaining a new connection diagram and causing the I/O access channel connectors, the storage arrays and the commutator to implement operation in accordance with the new connection diagram; and a bandwidth manager, coupled to the control system, for generating a new connection diagram.

28. A data/video server, comprising:

n I/O access channel connectors;

m storage arrays;

a commutator which connects individual ones of the I/O access channel connectors to different individual ones of the storage arrays in accordance with a connection diagram with which the server is being operated in accordance with at a given time;

a control system for obtaining a new connection diagram and causing the I/O access channel connectors, the storage arrays and the commutator to implement operation in accordance with the new connection diagram; and synchronizing means for synchronizing each of the I/O access channel connectors, storage arrays and commutator so that they can implement in accordance with the new connection diagram at substantially the same time.

29. A data/video server, comprising the following elements:

n I/O access channel connectors, each of which includes a microprocessor therein;

m storage arrays, one of which includes a bandwidth manager therein for generating a new connection diagram, and each of which includes a microprocessor therein; and and a commutator which connects individual ones of the I/O access channel connectors to different individual ones of the storage arrays in accordance with a connection diagram with which the elements are operated in accordance with at a given time, which commutator includes a microprocessor therein;

wherein the microprocessors included in the elements obtain the new connection diagram and cause the elements to implement operation in accordance therewith in place of an old connection diagram at an implementation time by causing them to begin operating in accordance with the new connection diagram at the implementation time, but subject to and in accordance with one or more transition rules, during the beginning of such operating, which ensure that there is a smooth operational transition between operation in accordance with the old connection diagram and operation in accordance with the new connection diagram.

30. The server as claimed in claim 29, wherein the connection diagram in which the elements operate in accordance with at a given time indicates which one(s) of the I/O access channel connectors should be individually connected to which one(s) of the storage arrays individually during a supercycle time period, and the elements operate in accordance with such a connection diagram supercycle time period after supercycle time period; each of the elements further include a counter for counting supercycle time periods; the storage array which includes the bandwidth manager therein further includes a counter signal generator for generating a counter increment signal for incrementing a count value of each of the counters each time the I/O access channel connector in which it is included completes operating in accordance with a connection diagram, thereby indicating that a supercycle time period has been completed; the bandwidth manager (a) determines the implementation time on the basis of the count value of the counter included in the I/O access channel connector in which it is included to be a count value which is higher than that count value, and (b) ensures that each of the microprocessors included in the elements receives implementation time information relating to the implementation time; and the microprocessors included in the elements upon receiving the implementation time information cause the counters therein to synchronize with one another so that the elements can implement operation in accordance with the new connection diagram substantially simultaneously at the implementation time.

31. The system as claimed in claim 29, wherein the connection diagram in which the elements operate in accordance with at a give time indicates which one(s) of the I/O access channel connectors should be individually connected to which one(s) of the storage arrays individually during successive sub-periods of a supercycle time period, and the elements operate in accordance with such a connection diagram supercycle time period after supercycle time period; each of the elements further include a counter for counting sub-periods of a supercycle period; the storage array which includes the bandwidth manager therein further includes a counter signal generator for generating a counter increment signal for incrementing each of the counters each time the I/O access channel connector in which it is included completes operating in accordance with a sub-period; and the microprocessors included in the elements ensures that the operation of those elements in accordance with the new connection diagram is subject to and in accordance with the one or more transition rules during at least the beginning of a transition time period, which thereby results in the server operating in accordance with a transition connection diagram during the transition period which may be different from the new connection diagram, with the aid of the counters, which indicate when each sub-period of the transition time period takes place.

* * * * *